(12) United States Patent
Massey et al.

(10) Patent No.: US 6,431,239 B1
(45) Date of Patent: Aug. 13, 2002

(54) GAS HEATED SEAMING IRON

(76) Inventors: Robert E. Massey, 2806 Holbrook St.;
Stanley L. Massey, 1209 Landon St.,
both of Durham, NC (US) 27703

(*) Notice: Subject to any disclaimer, the term of this patent is extended or adjusted under 35 U.S.C. 154(b) by 39 days.

(21) Appl. No.: 09/697,840

(22) Filed: Oct. 26, 2000

(51) Int. Cl.[7] ............................................... B29C 65/00
(52) U.S. Cl. ................. 156/497; 156/304.4; 156/304.6; 156/391; 156/579
(58) Field of Search ............................. 156/82, 304.1, 156/304.3, 304.4, 304.6, 304.7, 391, 497, 579

(56) References Cited

U.S. PATENT DOCUMENTS

| | | |
|---|---|---|
| 3,927,298 A | 12/1975 | Prater |
| 4,536,244 A | 8/1985 | Greci et al. |
| 5,089,080 A | 2/1992 | Ramirez et al. |
| 5,210,394 A | 5/1993 | Kerremans |
| 5,384,001 A | 1/1995 | Hoopengardner |
| 5,453,150 A * | 9/1995 | Hoopengardner ........... 156/391 |
| D376,232 S | 12/1996 | Villar |

* cited by examiner

*Primary Examiner*—James Sells

(57) ABSTRACT

A gas heated seaming iron for heating carpet during the seaming process. The gas heated seaming iron includes a base plate. The base plate has a top side, a bottom side and a peripheral edge extending therebetween. The top side has an elongate depression therein. The base plate comprises a metal material. A shield member is securely coupled to the peripheral edge of the base plate such that the shield member covers the top side of the base plate. A lumen is defined between a bottom wall of the depression and the shield member. The shield has a first hole and a second hole therein extending into the lumen. A block portion has a bottom wall, a top wall, a front wall, a back wall and pair of side walls. The bottom wall is securely attached to the shield member, the block portion covering the first hole. The back wall has an air supply tube extending therein and into the aperture. An elongate member is coupled to and extends away from the back wall of the block portion. A coupling member is adapted for removably and fluidly coupling to a fuel supply. A valve means controls outward flow of the fuel supply. A supply tube has a first end fluidly coupled to the valve means and a second end extending into the aperture in the block portion. An ignition actuator ignites a flame at the second end of the supply tube.

13 Claims, 6 Drawing Sheets

GAS HEATED SEAMING IRON

BACKGROUND OF THE INVENTION

1. Field of the Invention

The present invention relates to seaming iron device and more particularly pertains to a new gas heated seaming iron for heating carpet during the seaming process.

2. Description of the Prior Art

The use of seaming iron device is known in the prior art. More specifically, seaming iron device heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,089,080; U.S. Des. Pat. No. 376,232; U.S. Pat. Nos. 3,927,298; 5,348,001; 5,210,394; and 4,536,244.

While these devices fulfill their respective, particular objectives and requirements, the aforementioned patents do not disclose a new gas heated seaming iron. The inventive device includes a base plate. The base plate has a top side, a bottom side and a peripheral edge extending therebetween. The top side has an elongate depression therein. The base plate comprises a metal material. A shield member is securely coupled to the peripheral edge of the base plate such that the shield member covers the top side of the base plate. A lumen is defined between a bottom wall of the depression and the shield member. The shield has a first hole and a second hole therein extending into the lumen. A block portion has a bottom wall, a top wall, a front wall, a back wall and pair of side walls. The bottom wall is securely attached to the shield member, the block portion covering the first hole. The back wall has an air supply tube extending therein and into the aperture. An elongate member is coupled to and extends away from the back wall of the block portion. A coupling member is adapted for removably and fluidly coupling to a fuel supply. A valve means controls outward flow of the fuel supply. A supply tube has a first end fluidly coupled to the valve means and a second end extending into the aperture in the block portion. An ignition actuator ignites a flame at the second end of the supply tube.

In these respects, the gas heated seaming iron according to the present invention substantially departs from the conventional concepts and designs of the prior art, and in so doing provides an apparatus primarily developed for the purpose of heating carpet during the seaming process.

SUMMARY OF THE INVENTION

In view of the foregoing disadvantages inherent in the known types of seaming iron device now present in the prior art, the present invention provides a new gas heated seaming iron construction wherein the same can be utilized for heating carpet during the seaming process.

The general purpose of the present invention, which will be described subsequently in greater detail, is to provide a new gas heated seaming iron apparatus and method which has many of the advantages of the seaming iron device mentioned heretofore and many novel features that result in a new gas heated seaming iron which is not anticipated, rendered obvious, suggested, or even implied by any of the prior art seaming iron device, either alone or in any combination thereof.

To attain this, the present invention generally comprises a base plate. The base plate has a top side, a bottom side and a peripheral edge extending therebetween. The top side has an elongate depression therein. The base plate comprises a metal material. A shield member is securely coupled to the peripheral edge of the base plate such that the shield member covers the top side of the base plate. A lumen is defined between a bottom wall of the depression and the shield member. The shield has a first hole and a second hole therein extending into the lumen. A block portion has a bottom wall, a top wall, a front wall, a back wall and pair of side walls. The bottom wall is securely attached to the shield member, the block portion covering the first hole. The back wall has an air supply tube extending therein and into the aperture. An elongate member is coupled to and extends away from the back wall of the block portion. A coupling member is adapted for removably and fluidly coupling to a fuel supply. A valve means controls outward flow of the fuel supply. A supply tube has a first end fluidly coupled to the valve means and a second end extending into the aperture in the block portion. An ignition actuator ignites a flame at the second end of the supply tube.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured bythe claims, nor is it intended to be limiting as to the scope of the invention in any way.

It is therefore an object of the present invention to provide a new gas heated seaming iron apparatus and method which has many of the advantages of the seaming iron device mentioned heretofore and many novel features that result in a new gas heated seaming iron which is not anticipated, rendered obvious, suggested, or even implied by any of the prior art seaming iron device, either alone or in any combination thereof.

It is another object of the present invention to provide a new gas heated seaming iron which may be easily and efficiently manufactured and marketed.

It is a further object of the present invention to provide a new gas heated seaming iron which is of a durable and reliable construction.

An even further object of the present invention is to provide a new gas heated seaming iron which is susceptible of a low cost of manufacture with regard to both materials and labor, and which accordingly is then susceptible of low prices of sale to the consuming public, thereby making such gas heated seaming iron economically available to the buying public.

Still yet another object of the present invention is to provide a new gas heated seaming iron which provides in the apparatuses and methods of the prior art some of the advantages thereof, while simultaneously overcoming some of the disadvantages normally associated therewith.

Still another object of the present invention is to provide a new gas heated seaming iron for heating carpet during the seaming process.

Yet another object of the present invention is to provide a new gas heated seaming iron which includes a base plate. The base plate has a top side, a bottom side and a peripheral edge extending therebetween. The top side has an elongate depression therein. The base plate comprises a metal material. A shield member is securely coupled to the peripheral edge of the base plate such that the shield member covers the top side of the base plate. A lumen is defined between a bottom wall of the depression and the shield member. The shield has a first hole and a second hole therein extending into the lumen. A block portion has a bottom wall, a top wall, a front wall, a back wall and pair of side walls. The bottom wall is securely attached to the shield member, the block portion covering the first hole. The back wall has an air supply tube extending therein and into the aperture. An elongate member is coupled to and extends away from the back wall of the block portion. A coupling member is adapted for removably and fluidly coupling to a fuel supply. A valve means controls outward flow of the fuel supply. A supply tube has a first end fluidly coupled to the valve means and a second end extending into the aperture in the block portion. An ignition actuator ignites a flame at the second end of the supply tube.

Still yet another object of the present invention is to provide a new gas heated seaming iron that does not require the use of electricity when seaming carpets together.

Even still another object of the present invention is to provide a new gas heated seaming iron that has a resting member for placement of the device upon when not in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
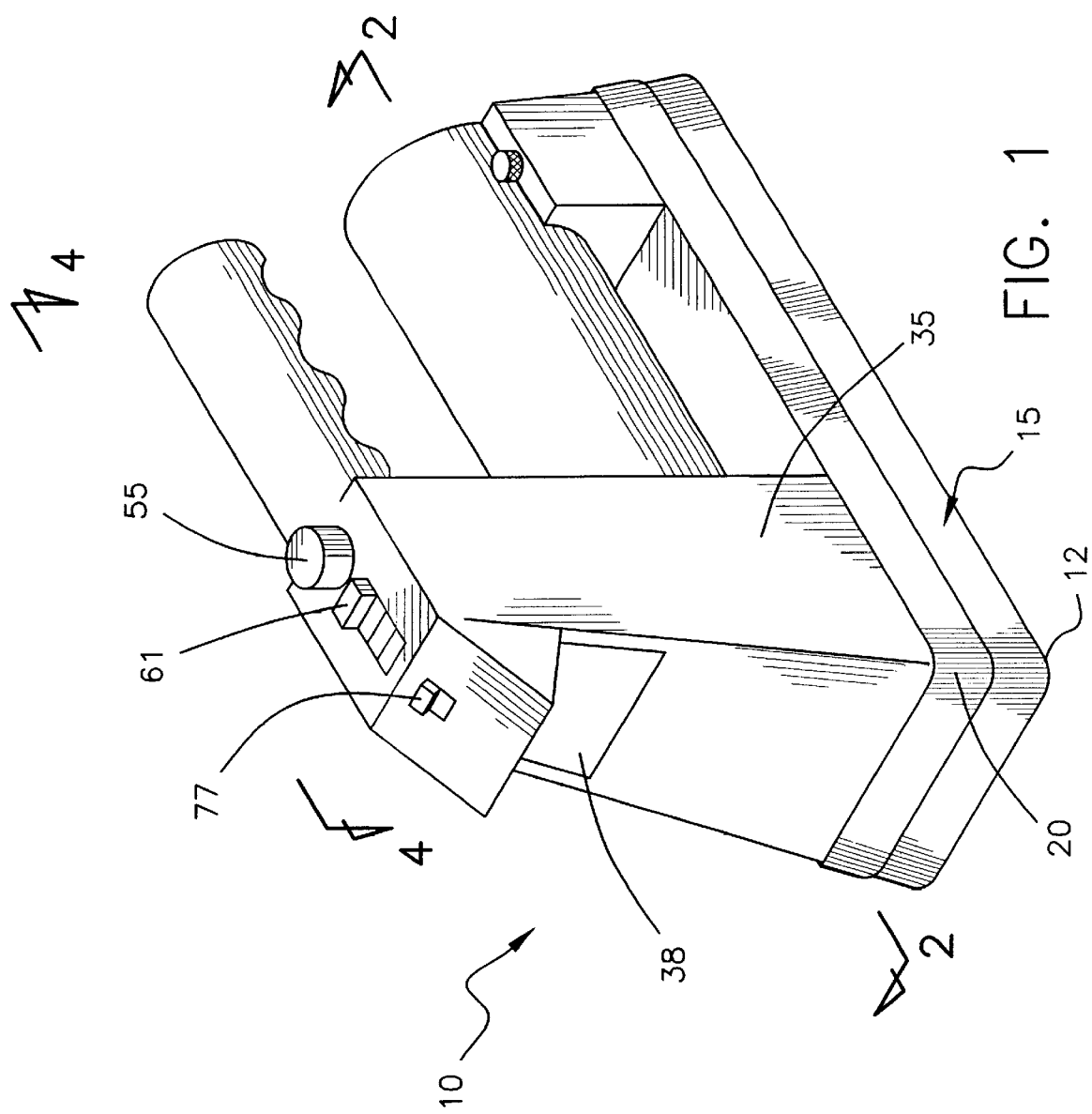
FIG. 1 is a schematic perspective view of a new gas heated seaming iron according to the present invention.
Figure 2:
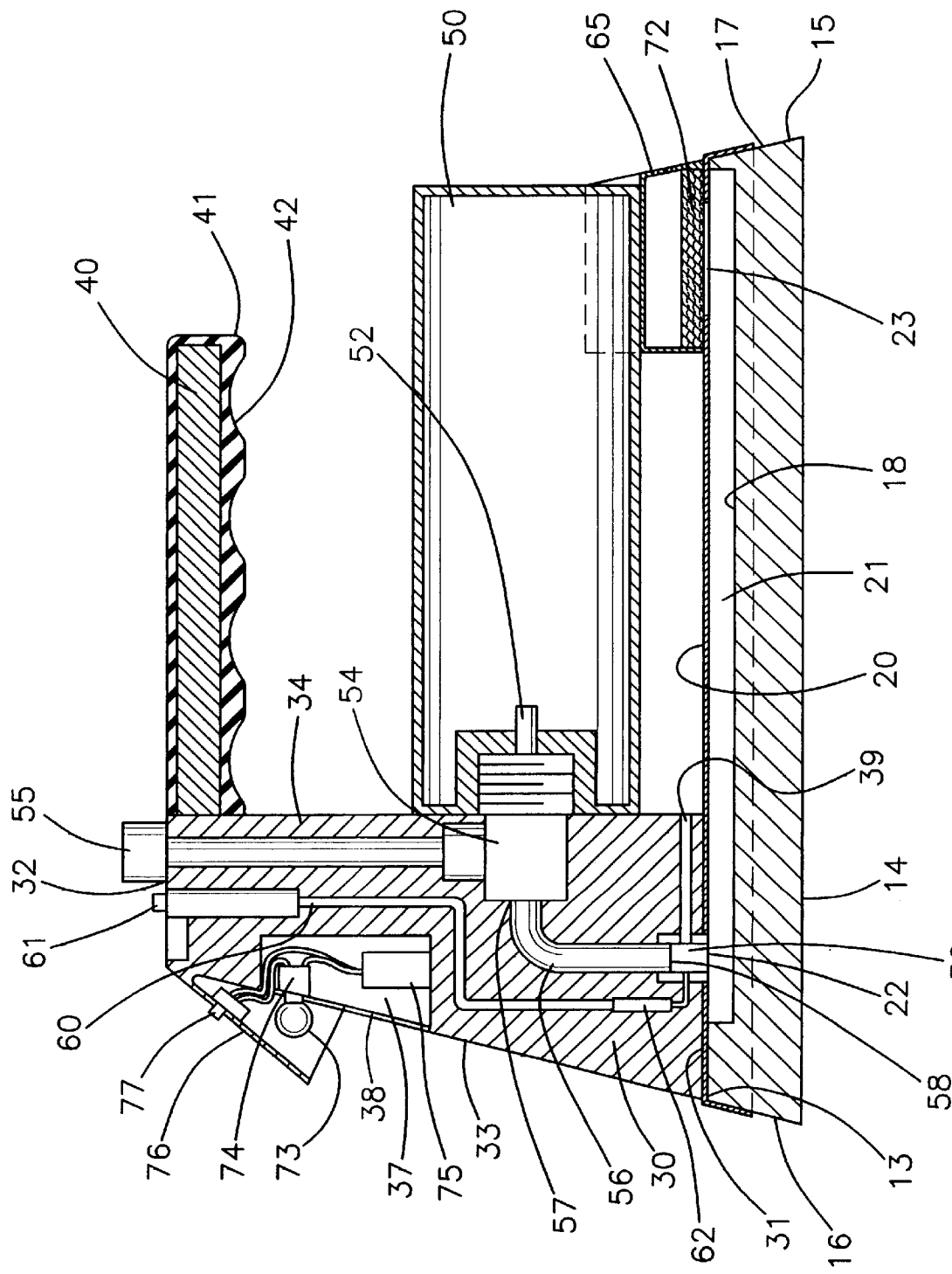
FIG. 2 is a schematic cross sectional view taken along line 2—2 of the present invention.
Figure 3:
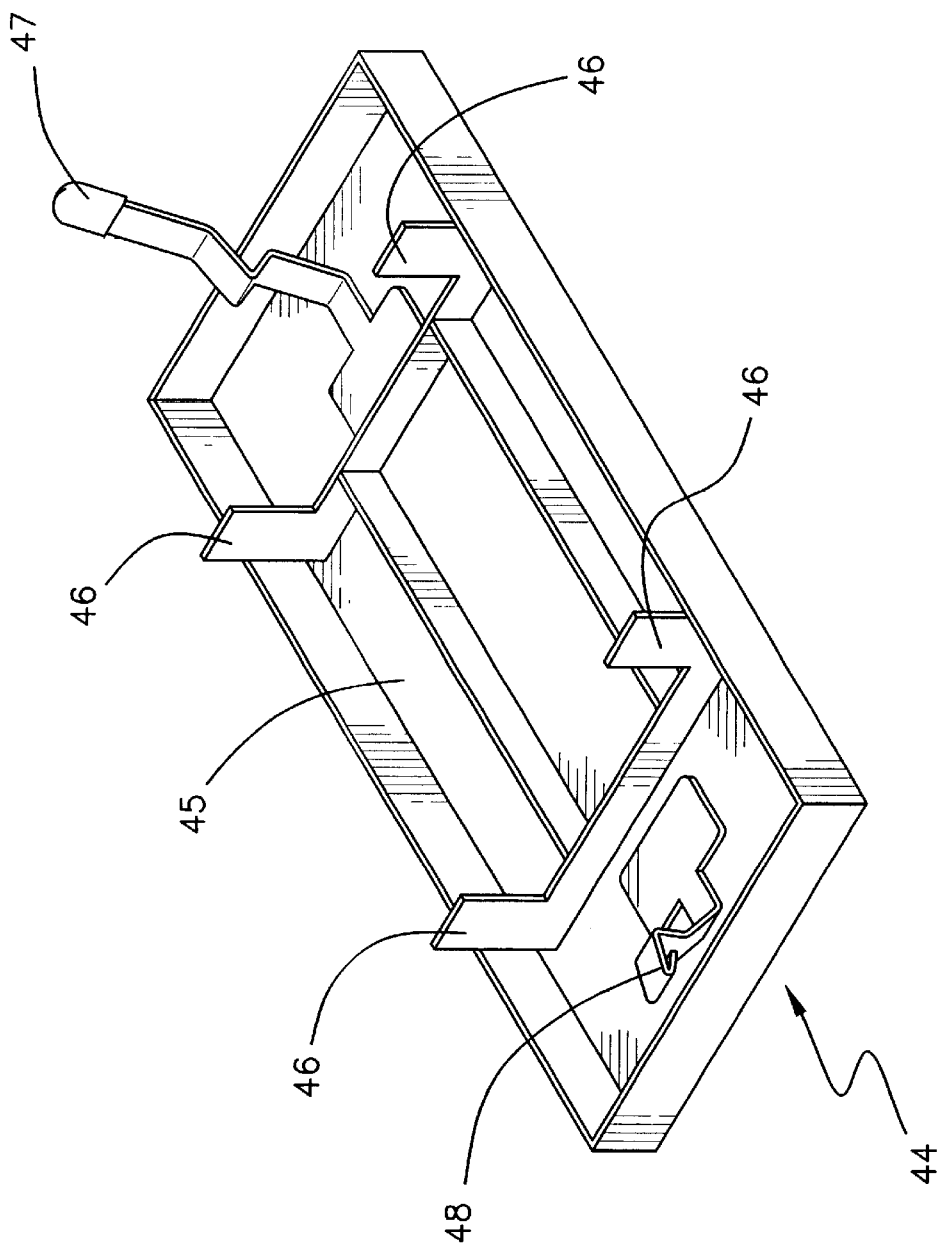
FIG. 3 is a schematic perspective view of the resting member of the present invention.
Figure 4:
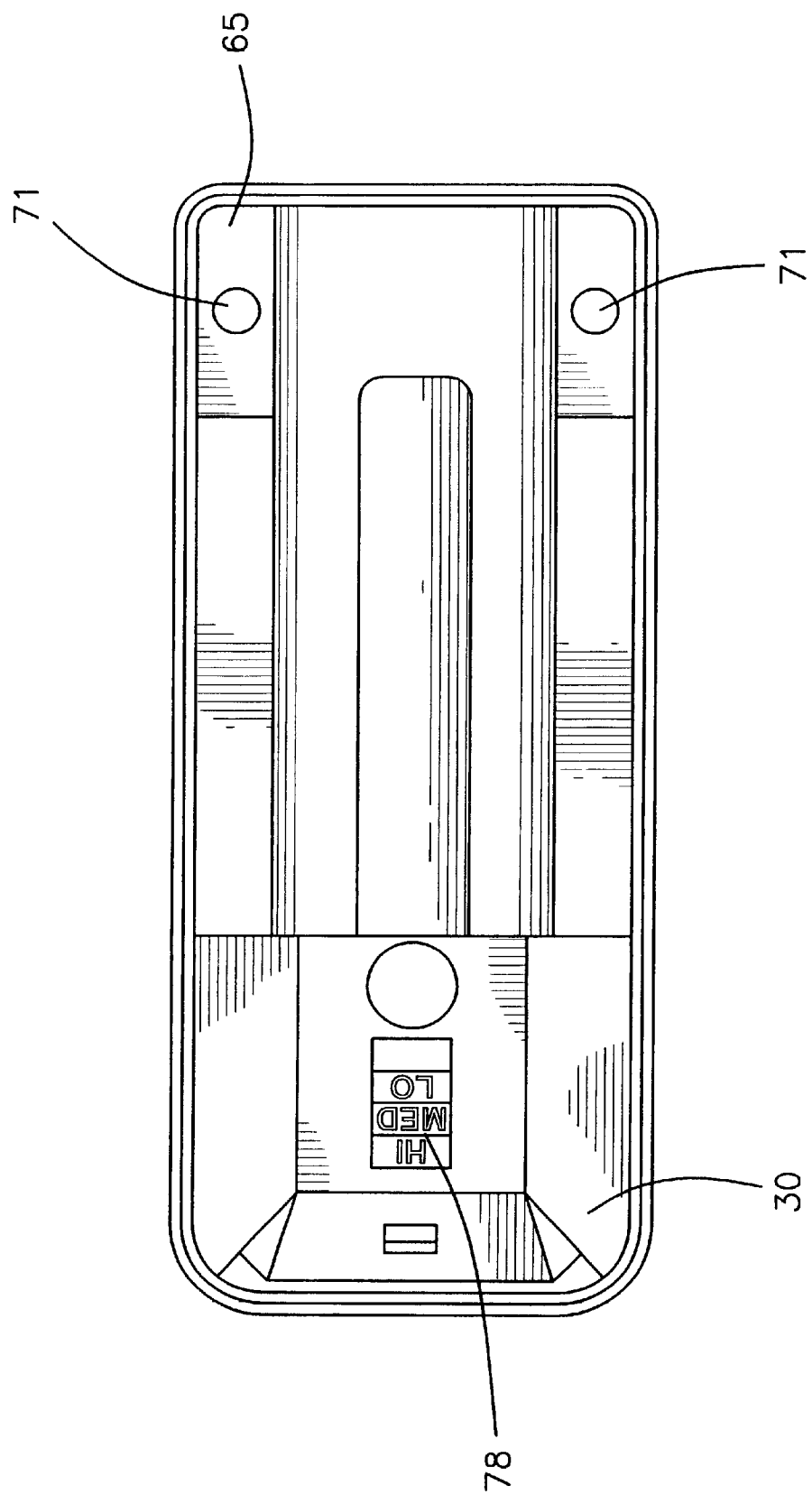
FIG. 4 is a schematic top view of the present invention.
Figure 5:
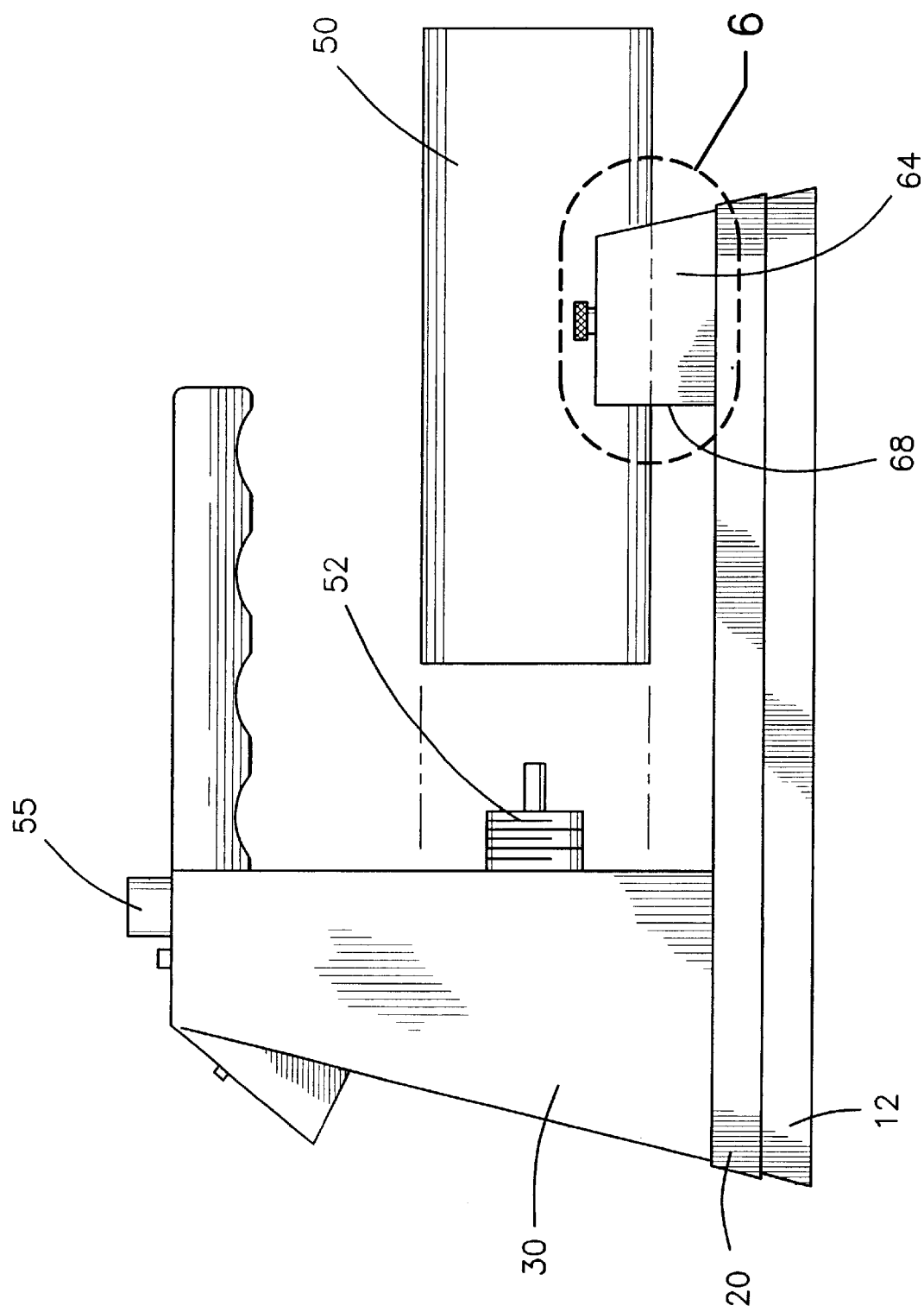
FIG. 5 is a schematic side view of the present invention.
Figure 6:
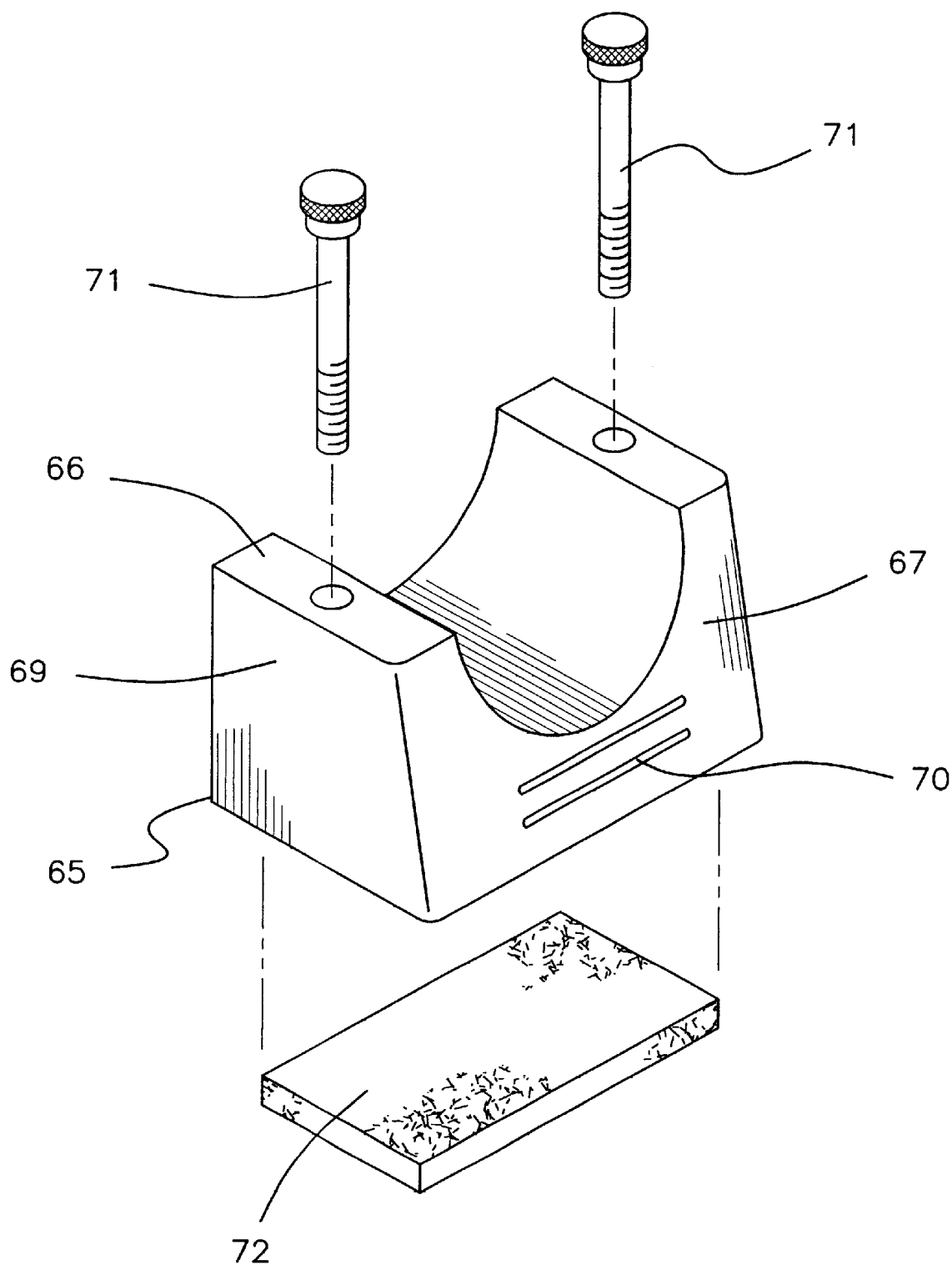
FIG. 6 is a schematic perspective exploded view of the exhaust filtering means of the present invention.

With reference now to the drawings, and in particular to FIGS. 1 through 6 thereof, a new gas heated seaming iron embodying the principles and concepts of the present invention and generally designated by the reference numeral 10 will be described.

As best illustrated in FIGS. 1 through 6, he gas heated seaming iron 10 generally comprises a base plate 12. The base plate 12 has a top side 13, a bottom side 14 and a peripheral edge 15 extending therebetween. The base plate 12 has a front side 16 and a back side 17. The top side 13 has an elongate depression 18 therein. The base plate 12 preferably comprises a metal material.

A shield member 20 is securely coupled to the peripheral edge 15 of the base plate 12 such that the shield member 20 covers the top side 13 of the base plate. A lumen 21 is defined between a bottom wall of the depression 18 and the shield member 20. The shield member 20 has a first hole 22 and a second hole 23 therein extending into the lumen 21. The first hole 22 is positioned respectively nearer the front side 16 of the base plate 12 and the second hole 23 is positioned generally nearer the back side 17 of the base plate.

A block portion 30 has a bottom wall 31, a top wall 32, a front wall 33, a back wall 34 and pair of side walls 35. The bottom wall 31 is securely attached to the shield member 20. The block portion 30 is positioned generally adjacent to the front side 16 of the base plate 12 such that the block portion 30 covers the first hole 22. The block member 30 has an aperture 36 therein extending upwardly from the first hole 22. The front wall 33 has an opening 37 therein. A door 38 selectively closes the opening 37 in the front wall. The back wall 34 has an air supply tube 39 extending therein and into the aperture 22.

An elongate member 40 is coupled to and extends away from the back wall 34 of the block portion 30. The elongate member 40 is generally positioned adjacent to the top wall 32. The elongate member 40 ideally has an elastomeric coating 41 thereon having finger engaging ridges 42 therein. The elongate member 40 defines a handle;

A fuel supply 50 is used for heating the base plate 12. The fuel supply 50 ideally comprises a propane canister. The propane canister has propane gas therein.

A coupling member 52 is adapted for removably an d fluidly coupling to the propane canister. The coupling member 52 is securely coupled to and extending into the back wall 34.

A valve means 54 controls outward flow of the fuel supply. The valve means 54 is fluidly coupled to the coupling member 52. The valve means 54 is positioned in the block portion 30 and extends upwardly through the top wall 32. A free end of the valve means comprises an actuator 55 for opening and closing the valve means 54.

A supply tube 56 has a first end 57 fluidly coupled to the valve means 54 and a second end 58 extending into the aperture 36 in the block portion 30.

An ignition actuator 60 ignites a flame at the second end 57 of the supply tube 56. The ignition actuator 60 is elongate and has an actuator portion 61 and an ignition portion 62. The ignition actuator 60 extends through the block portion 30. The ignition portion 62 extends into the aperture 39. The actuator portion 61 extends upwardly out of the top wall 32. The ignition actuator 60, valve means 54, coupling member 52 and supply tube 56 are conventional and typically found in devices using propane tanks, such as gas grills.

An exhaust filtering means 64 is removably secured to the shield member 20 and positioned over the second hole 23. The exhaust filter means 64 comprises a generally hollow housing 65 having a top surface 66, a back surface 67, a front surface 68 and a pair of side surfaces 69 such that a bottom side of the housing 65 is open. The back surface 67 has a plurality of slots 70 therein extending into the housing 65. A pair of fastening means 71 removably fastens the housing 65 to the shield member 20. The fastening means 71 extend through the top surface 66 and into the shield member 20. A filter member 72 is positioned in the housing and covers the second hole 23. The filter member 72 is a conventional air filter. The top surface 66 of the housing 65 is generally concave for abutting the propane canister against.

A light 73, the light is removably coupled to a light socket 74 fixedly mounted in the front wall 33 of the block portion 30. A power supply 75 is positioned in the opening 37 in the front wall and is operationally coupled to the light 73. A yawning 76 is integrally coupled to the front wall and extends over the light 73. A switch member 77 for turning the light on is operationally coupled to the power supply 75. The switch member 77 is securely coupled to the yawning 76.

A resting member 44 for resting the base plate 12 on includes a panel 45 having a top side having a plurality of upright members 46 therein. A first 47 and second 48 bracket are positioned at opposite ends of the panel and are adapted for releasably coupling to the base plate 12. The base plate 12 is positioned on the free ends of the upright members 46 and the brackets 47, 48 are engaged to secure the base plate to the panel. The upstanding members are preferably comprised of a metal.

Preferably, a thermostat 78 is positioned in the block member 30 and is mechanically coupled to the base plate 12 to monitor the temperature of the base plate.

In use, when seaming carpet, the adhesive is adhered the carpet by heating the carpet with the device. The user connects the propane canister to the coupling member and opens the valve means. The ignition actuator ignites a flame which travels in the lumen and heats the base plate. The base plate is then pressed against the carpet to heat it.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A gas powered seaming iron device, said device comprising:
   a baseplate, said base plate having a top side, a bottom side and a peripheral edge extending therebetween, said top side having an elongate depression therein, said base plate comprising a metal material;
   a shield member, said shield member being securely coupled to said peripheral edge of said base plate such that said shield member covers said top side of said base plate, a lumen being defined between a bottom wall of said depression and said shield member, said shield having a first hole and a second hole therein extending into said lumen;
   a block portion, said block portion having a bottom wall, a top wall, a front wall, a back wall and pair of side walls, said bottom wall being securely attached to said shield member, said block portion covering said first hole, said back wall having an air supply tube extending therein and into an aperture;
   an elongate member being coupled to and extending away from said back wall of said block portion;
   a fuel supply;
   a coupling member, said coupling member being adapted for removably and fluidly coupling to said fuel supply;
   a valve means for controlling outward flow of said fuel supply;
   a supply tube, said supply tube having a first end fluidly coupled to said valve means and a second end extending into said aperture in said block portion; and
   an ignition actuator for igniting a flame.

2. The gas powered seaming iron device as in claim 1, wherein said device further comprises:
   said base plate having a front side and a back side;
   said first hole in said shield member being positioned respectively nearer said front side of said base plate and said second hole being positioned generally nearer said back side of said base plate.

3. The gas powered seaming iron device as in claim 1, further comprising
   said front wall having an opening therein, a door selectively closes said opening in said front wall;
   a light, said light being removably coupled to a light socket fixedly mounted in said front wall of said block portion; and
   a power supply being positioned in said opening in said front wall and being operationally coupled to said light.

4. The gas powered seaming iron device as in claim 3, further comprising:
   a yawning being integrally coupled to said front wall and extending over said light; and
   a switch member for turning said light on, said switch member being operationally coupled to said power supply, said switch member being securely coupled to said yawning.

5. The gas powered seaming iron device as in claim 1, wherein said elongate member further comprises:
   said elongate member being generally positioned adjacent to said top wall, said elongate member having an elastomeric coating thereon, said elongate member defining a handle.

6. The gas powered seaming iron device as in claim 1, wherein said device further comprises:

said fuel supply comprising a propane canister, said propane canister having propane gas therein;

said coupling member being adapted for removably and fluidly coupling to said propane canister, said coupling member being securely coupled to and extending into said back wall; and said valve means being positioned in said block portion and extending upwardly through said top wall, a free end of said valve means comprising an actuator for opening and closing said valve means.

7. The gas powered seaming iron device as in claim 6, wherein said ignition actuator comprises:

said ignition actuator being elongate and having a actuator portion and an ignition portion, said ignition actuator extending through said block portion, said ignition portion extending into said aperture, said actuator portion extending upwardly out of said top wall.

8. The gas powered seaming iron device as in claim 7, further comprising:

an exhaust filtering means, said exhaust filtering means being removably secured to said shield member and positioned over said second hole.

9. The gas powered seaming iron device as in claim 8, wherein said exhaust filtering means comprises:

a generally hollow housing having a top surface, a back surface, a front surface and a pair of side surfaces such that a bottom side of said housing is open, said back surface having a plurality of slots therein extending into said housing, a fastening means for removably fastening said housing to said shield member extending through said top surface and into said shield member, a filter member being positioned in said housing and covering said second hole.

10. The gas powered seaming iron device as in claim 1, further comprising:

an exhaust filtering means, said exhaust filtering means being removably secured to said shield member and positioned over said second hole.

11. The gas powered seaming iron device as in claim 10, wherein said exhaust filtering means comprises:

a generally hollow housing having a top surface, a back surface, a front surface and a pair of side surfaces such that a bottom side of said housing is open, said back surface having a plurality of slots therein extending into said housing, a pair of fastening means for removably fastening said housing to said shield member extending through said top surface and into said shield member, a filter member being positioned in said housing and covering said second hole.

12. A gas powered seaming iron device said device comprising:

a base plate, said base plate having a top side, a bottom side and a peripheral edge extending therebetween, said base plate having a front side and a back side, said top side having an elongate depression therein, said base plate comprising a metal material;

a shield member, said shield member being securely coupled to said peripheral edge of said base plate such that said shield member covers said top side of said base plate, a lumen being defined between a bottom wall of said depression and said shield member, said shield having a first hole and a second hole therein extending into said lumen, said first hole being positioned respectively nearer said front side of said base plate and said second hole being positioned generally nearer said back side of said base plate;

a block portion, said block portion having a bottom wall, a top wall, a front wall, a back wall and pair of side walls, said bottom wall being securely attached to said shield member, said block portion being positioned generally adjacent to said front side of said base plate such that said block portion covers said first hole, said block member having an aperture therein extending upwardly from said first hole, said front wall having an opening therein, a door selectively closes said opening in said front wall, said back wall having an air supply tube extending therein and into said aperture;

an elongate member being coupled to and extending away from said back wall of said block portion, said elongate member being generally positioned adjacent to said top wall, said elongate member having an elastomeric coating thereon, said elongate member defining a handle;

a fuel supply, said fuel supply comprising a propane canister, said propane canister having propane gas therein;

a coupling member, said coupling member being adapted for removably and fluidly coupling to said propane canister, said coupling member being securely coupled to and extending into said back wall;

a valve means for controlling outward flow of said fuel supply, said valve means being fluidly coupled to said coupling member, said valve means being positioned in said block portion and extending upwardly through said top wall, a free end of said valve means comprising an actuator for opening and closing said valve means;

a supply tube, said supply tube having a first end fluidly coupled to said valve means and a second end extending into said aperture in said block portion;

an ignition actuator for igniting a flame, said ignition actuator being elongate and having a actuator portion and an ignition portion, said ignition actuator extending through said block portion, said ignition portion extending into said aperture, said actuator portion extending upwardly out of said top wall;

an exhaust filtering means, said exhaust filtering means being removably secured to said shield member and positioned over said second hole, said exhaust filtering means comprising a generally hollow housing having a top surface, a back surface, a front surface and a pair of side surfaces such that a bottom side of said housing is open, said back surface having a plurality of slots therein extending into said housing, a pair of fastening means for removably fastening said housing to said shield member extending through said top surface and into said shield member, a filter member being positioned in said housing and covering said second hole, said top surface of said housing being generally concave for abutting said propane canister against;

a light, said light being removably coupled to a light socket fixedly mounted in said front wall of said block portion;

a power supply being positioned in said opening in said front wall and being operationally coupled to said light;

a yawning being integrally coupled to said front wall and extending over said light; and a switch member for turning said light on, said switch member being operationally coupled to said power supply, said switch member being securely coupled to said yawning.

13. The gas powered seaming iron device as in claim 12, further comprising:

a resting member for resting the base plate, the resting member includes a panel having a top side having a plurality of upright members therein, a first bracket and a second bracket are positioned at opposite ends of the panel and are each adapted for releasably coupling to the base plate, wherein the base plate may be positioned on free ends of the upright members and the brackets engaged to secure the base plate to the panel.

* * * * *